United States Patent [19]

Carlson

[11] Patent Number: 4,534,682
[45] Date of Patent: Aug. 13, 1985

[54] HAND AIRFEED POWERTOOL
[75] Inventor: Ronald F. Carlson, La Jolla, Calif.
[73] Assignee: General Dynamics Corporation/Convair Div., San Diego, Calif.
[21] Appl. No.: 453,308
[22] Filed: Dec. 27, 1982
[51] Int. Cl.³ .............................................. B23B 45/04
[52] U.S. Cl. ..................................... 408/14; 408/130; 408/702
[58] Field of Search ................... 408/10, 14, 111, 112, 408/143, 241 S, 130, 702, 129

[56] References Cited
U.S. PATENT DOCUMENTS

| | | | |
|---|---|---|---|
| 2,488,992 | 11/1949 | Taylor | 408/112 |
| 2,527,968 | 10/1950 | Sherman et al. | 408/14 |
| 2,643,555 | 6/1953 | Steibel | 408/130 |
| 2,657,595 | 11/1953 | Shaff | 408/111 |
| 2,852,965 | 9/1958 | Wallace | 408/17 |
| 2,883,891 | 4/1959 | Shulters et al. | 408/130 |
| 3,362,266 | 1/1968 | Krafft | 408/10 |
| 4,329,092 | 5/1982 | Pönitzcsh et al. | 408/11 |
| 4,421,441 | 12/1983 | Hirose | 408/17 |

Primary Examiner—Gil Weidenfeld
Assistant Examiner—Daniel W. Howell
Attorney, Agent, or Firm—John R. Duncan; Frank D. Gilliam

[57] ABSTRACT

A feed rate attachment for a drilling tool or the like. The drilling tool is equipped with a piston attached thereto operating within a cylinder positioned against the work-piece. A hydraulic damper is utilized to linearly resist the movement of the drilling tool attached piston relative to the cylinder.

5 Claims, 3 Drawing Figures

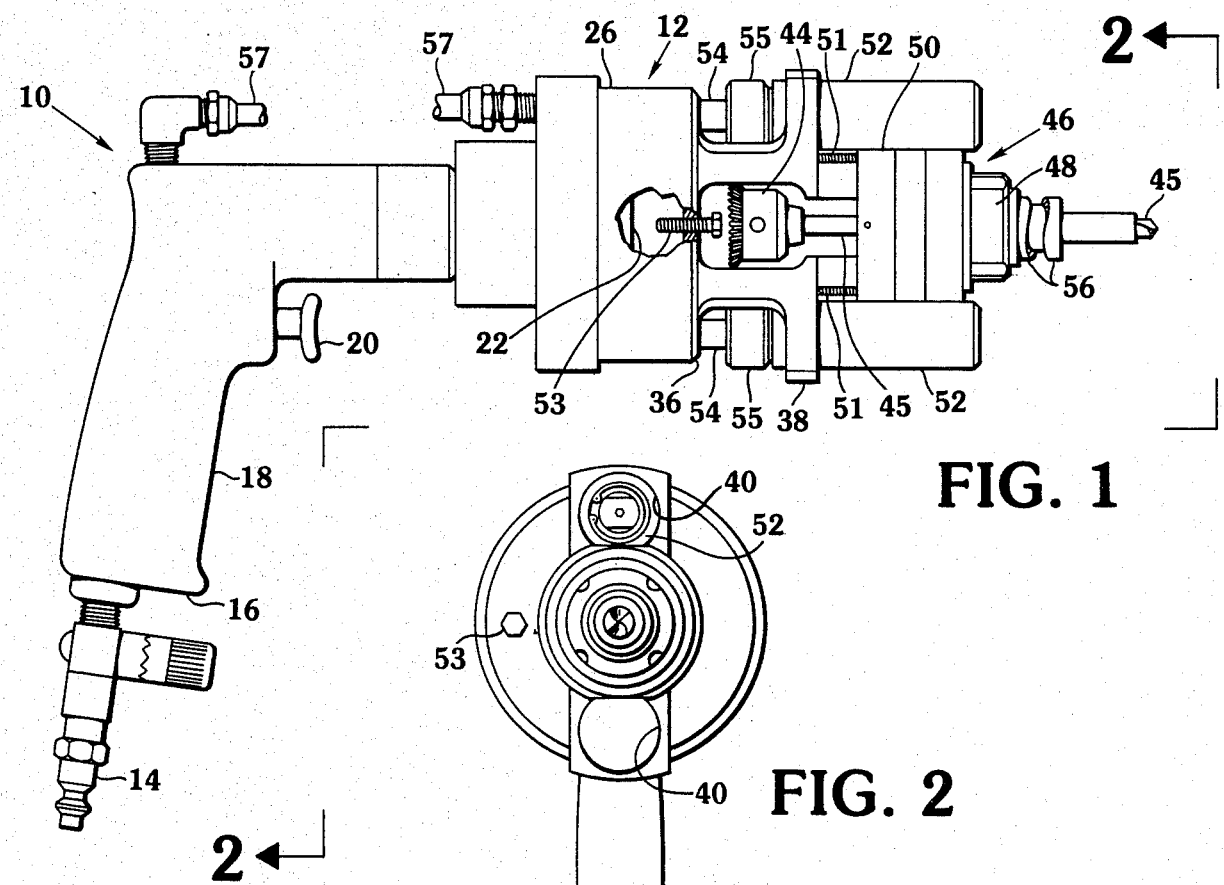
FIG. 1
FIG. 2
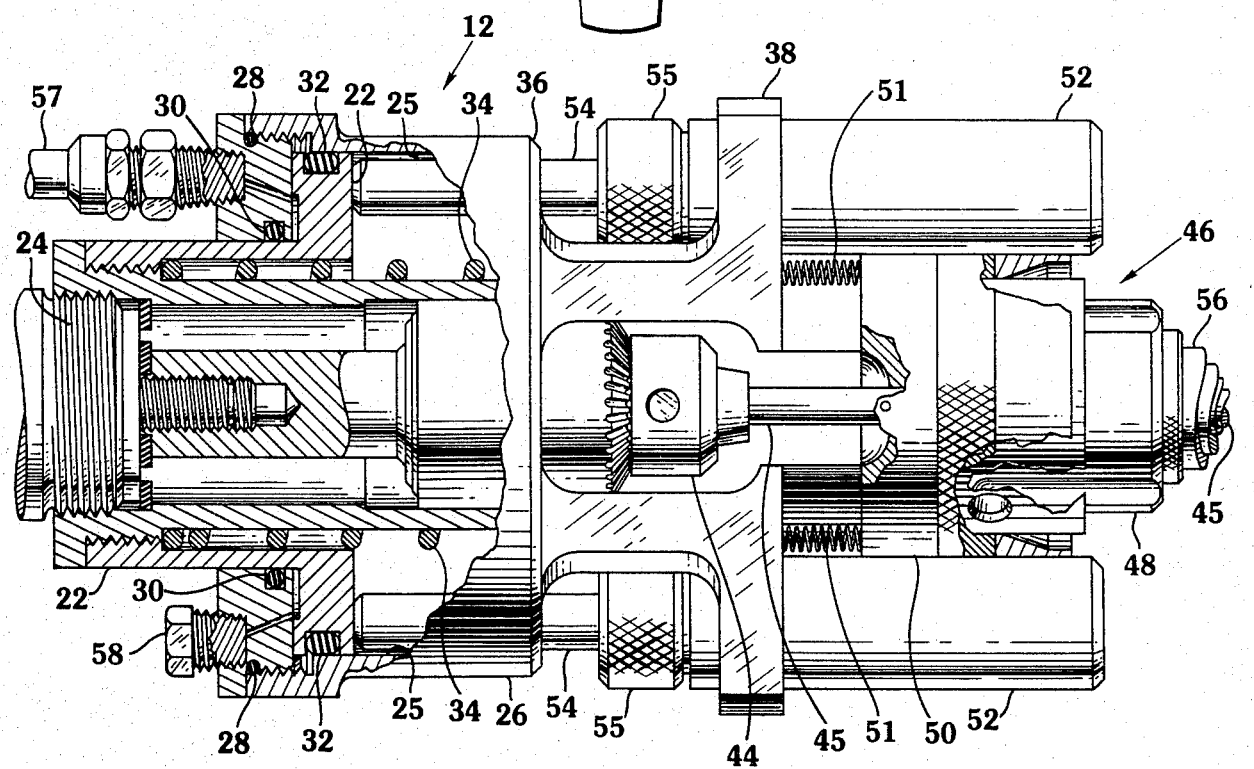
FIG. 3

HAND AIRFEED POWERTOOL

BACKGROUND OF THE INVENTION

The present invention relates generally to tools of the type intended for performing drilling and allied operations and more particularly to such tools which are effective not only to drive a rotary cutting element but also to impact feed and return movements thereto with respect to a work piece.

Pressure fluid operated tools possess numerous features and make their employment especially advantageous in an almost infinite number of applications among which features are included their comparatively small size, light weight, durability, ease of control, and safety. Each of these features has contributed to the wide use of portable tools of this type in the so-called temporary tooling practice which has been widely adopted by industry where frequent design changes make uneconomical the utilization of permanent, special-purpose machine tools.

Many portable pressure fluid operated tools incorporate piston and cylinder arrangements for effecting longitudinal, or feed and return spindle movement. Examples of such tools can be found in U.S. Pat. Nos. 2,527,968; 2,643,555; and 4,329,092.

In the case of such tools for performing drilling and allied operations on conventional materials it has been found difficult to achieve linear forward thrust control for advancing the cutting tool into the work.

There has not been an adequate means to provide linear control of the thrust of such a device until the emergence of the present invention.

SUMMARY OF THE INVENTION

The present invention provides a power operated tool, such as, for example, a drilling or milling tool which normally translates relative to the work piece for a drilling or milling operation. the translatable movement of the tool toward the work piece is controlled by at least one hydraulic damper in the form of a shock absorber. The hydraulic damper means provides linear movement of the tool toward the work piece and is adjustable through a range of resistance to normal tool movement.

Accordingly, it is a general object of the present invention to provide in a portable pressure fluid operated tool, simple and reliable means for providing a linear movement of the tool toward the work piece independently of the resistance to such movement offered by the work piece and at a predetermined rate and thrust.

Another object of the present invention is to provide a means of providing linear travel of the tool toward the work piece which is adjustable to provide a range of different resistances thereto independently of the resistance to such movement offered by the work piece.

A still further object of the invention is to provide a portable hand tool with positive rate adjustable linear feed control that is light in weight, uncomplicated, economically inexpensive to construct, maintain, and operate, and can be constructed of commercially available components.

Other objects and novelties of the invention will become apparent from the accompanying figures and description thereof which illustrates a certain embodiment of the invention and hereby becomes part of the specification which this embodiment is disclosed by way of illustration, it will be appreciated by those skilled in the art that the component elements of the invention are not limited to the example shown but are susceptible to various skillful modifications or substitutions in accordance with the existing knowledge without departing from the novelty and intent of the invention.

BRIEF DESCRIPTION OF THE DRAWINGS

FIG. 1 is a partial cutaway side elevation of the drilling tool with the control feed rate device of the invention attached;

FIG. 2 is an end view of FIG. 1 with a single damper element installed; and

FIG. 3 is a partial side view of the drilling tool showing the piston within the cylinder.

DETAILED DESCRIPTION OF THE DRAWINGS

A conventional drill motor assembly 10 is shown with the drill feed assembly 12, of the invention, attached thereto. The drilling motor 10 is of the air driven, such as for example and not by way of limitation, A Cleco ® drill motor model 111D0-7 or the like. The drill motor within the drill motor assembly 10 operates from an external source of high pressure air connected to the fitting 14 at the base or bottom 16 of the drill motor assembly handle 18. The motor within the drill motor assembly 10 operates when the trigger valve 20 is depressed. The operation of the air motor within the drilling motor assembly is well known in the art and needs no further discussion.

The piston 22 of the drill feed assembly 12 is connected to the end 24 of the drill motor assembly. The connection may be made by any conventional manner such as, for example and not by way of limitation, male threads on end 24 of the drill motor assembly and mating female threads on the inner surface of the piston 22. The piston is slidingly sealed to the inner surface 25 of the cylinder 26 by means of "O" ring seals 28 and 30 fixed in position in the cylinder end 32 carried by the piston. A high pressure seal is maintained between the cylinder and piston by this means.

A coil spring 34 causes the return of the piston 22 to the location shown in FIG. 1 when the trigger valve 20 is released and the pressure is exhausted from the high pressure side of the piston through the motor 10 in a conventional manner. The details of construction of the piston 22 and cylinder 26 assembly are fully disclosed in literature published by Dresser Industries, Inc., directed to their Cleco ® No. 11 series drill assist.

Attached to the front or forward surface 36 of the cylinder 26 is a housing 38. The housing 38 may be an integral portion of the cylinder or may be fixedly attached thereto by any convenient means.

Referring now to FIG. 2, the housing includes opposed openings 40. These openings 40 are designed to carry a hydraulic damper 52. Two hydraulic dampers 52 may by required for large drill motors while only a single damper will be required on small drill motors. In single damper installations either the upper or lower opening 40 may be used to support the single damper 52. The physical position of the damper is not critical to the operation of the device. In installations requring two dampers, the dampers are located in an opposed position as shown in FIG. 1 to balance the loads which they encounter.

The rotating shaft 42 of the drill includes a conventional Jacobs drill chuck 44 which grips a conventional drill bit 45 or the like in a conventional manner. Attached to housing 38 is a stop assembly 46 which limits the travel of the drill bit. The stop assembly is conventional in construction and includes a threaded length adjustment 48 and locking means 50 to maintain the length adjustment at a selected position. Springs 51 bias the locking means 50 in the locked position. Additionally, the saw or bolt 53 threaded through the rear wall of the cylinder is length adjustable therein to limit the translation of the piston.

The hydraulic damper 42, for example and not by way of limitation, may be an Ace ® mini cushion shock absorber model AHS or the like. The damper 42 has an outer housing 52 which is fixedly attached to the housing 38 by conventional means, such as mating threads (not shown). A piston rod 54 which can be translated relative to the housing 52 abuts against the outer surface of the piston 22. The damper 42 further includes an adjustment by way of knurd knob 55 for selecting the amount of resistance of movement of the piston rod 54 within the housing 52. The basic requirements of the damper 42 are that the travel of the piston rod be linear, the resistance against movement be adjustable and the piston rod is returned to its fully extended position (shown in FIG. 1) when the piston resistance is removed therefrom. The above mentioned damper 42 by Ace ® meets all of these requirements.

A flexible pressure line 57 connects a source of high pressure air to the forward surface of the piston 22.

OPERATION

The fitting 14 is attached to a source of high pressure and the length adjustment is made by assembly 46 to limit the travel of bit 45 relative to the end 56 of housing 38. The end 56 is positioned against the work piece to be drilled. The trigger 20 is operated causing the drill motor to rotate the drill bit 45, provide high pressure air through flexible hose 57 to the front surface of piston 22 causing the piston to move toward the work piece relative to cylinder 26 advancing the drill bit toward the work piece. The dampers or damper 52 resist the movement of the piston toward the work piece in a linear fashion according to a set resistance level. The piston continues to advance toward the work piece in this manner until the pre-set stop determined by the position of assembly 46 or the end of the screw or bolt 53 is reached. The work piece having now been drilled by the bit to a predetermined distance, the trigger valve 20 is released stopping the rotation of the drill and returning the piston 22 and piston rod or rods 54 back to their FIG. 1 location. The process is repeated according to the number of holes desired in the work piece or work pieces.

It will be obvious to those skilled in the art that many modifications may be made within the scope of the present invention without departing from the spirit thereof, and the invention includes all such modifications.

What is claimed is:

1. In combination with a drilling tool having an outer housing and a drill bit feed assembly attached to said housing for controlling the rate of feed and depth of the drill bit toward and into a workpiece comprising:
   a piston fixedly attached to said housing, said piston having a face portion;
   a cylinder carried by said piston for relative translation thereto;
   hydraulic damper means attached to said cylinder and having translating means continually bearing against the face portion of said piston within the cylinder to regulate the movement of said piston relative to said cylinder; and
   a stop member for controlling the length of relative travel of said cylinder and piston, said stop member comprises a bolt threadedly engaging said cylinder and penetrating a selected depth into said cylinder for piston face engagement to control the depth of said drill bit into said workpiece.

2. The invention as defined in claim 1 wherein said hydraulic damper means comprises at least one hydraulic shock absorber with a housing body having a translatable element therein.

3. The invention as defined in claim 1 additionally comprising bias means for biasing said piston in one direction of relative travel.

4. The invention as defined in claim 3 wherein said bias means is a coil spring.

5. The invention as defined in claim 1 wherein said hydraulic damper means comprises two hydraulic piston and cylinder combinations oppositely positioned on said cylinder.

* * * * *